March 29, 1966      H. F. OTT      3,242,604

PREPOPPED FILM TRANSPARENCY AND METHOD OF MAKING

Filed April 9, 1963      2 Sheets-Sheet 1

HOWARD F. OTT
INVENTOR.

BY R. Frank Smith
Karl J. Hormann
ATTORNEYS

March 29, 1966 H. F. OTT 3,242,604
PREPOPPED FILM TRANSPARENCY AND METHOD OF MAKING
Filed April 9, 1963 2 Sheets-Sheet 2

HOWARD F. OTT
INVENTOR.
BY R. Frank Smith
ATTORNEYS

United States Patent Office 3,242,604
Patented Mar. 29, 1966

3,242,604
PREPOPPED FILM TRANSPARENCY AND
METHOD OF MAKING
Howard F. Ott, Rochester, N.Y., assignor to Eastman Kodak Company, Rochester, N.Y., a corporation of New Jersey
Filed Apr. 9, 1963, Ser. No. 271,706
12 Claims. (Cl. 40—152)

This invention relates to a mount for a photographic film transparency and the method of making the same. In particular, the invention relates to an improved film transparency mount for preventing the abrupt shifting of the plane of the mounted film caused by the flexing of the film during projection. Abrupt shifting or flexing of the plane of the film transparency, which is commonly known as "popping," occurs most often when the film becomes heated during projection and results in an annoying change in focus of the projected image.

Generally, two somewhat related but separate physical characteristics of a film transparency determine the extent of the "popping" action thereof. These will be explained as now understood without any intention of limiting the scope of the invention in any manner by any theoretical aspects.

First, in the manufacture of film, a plurality of layers of gelatin emulsion are coated on one side of the clear plastic support, such as cellulose acetate. The thickness of the gelatin layers and the inherent curl or curvature of the support basically are the major characteristics which determine the resulting curvature of the processed film.

Secondly, the emulsion on the one side of the film will absorb moisture to a much greater degree than the support, such being conducive to a linear expansion of the emulsion side of the film to a greater degree than the support side of the film. Thus, when the film is subject to an ambient atmosphere containing high relative humidity, the film transparency will curl such that the face of the transparency having the emulsion coated thereon will tend to assume a convex curvature.

Generally, the processed film transparency is mounted between apertured frames and is supplied to the consumer with an inherent curvature such that the emulsion coated side is somewhat convex. A film transparency with such curvature is said to possess negative curl. It has been found that such film transparencies tend to abruptly shift or "pop" from a negative curl to a positive curl (emulsion coated side concave) while being exhibited in a slide projector, thereby producing the above-mentioned objectionable change in focus effect. This is due in part to the evaporation of moisture from the emulsion layer of the transparency when the transparency is subjected to heat by the projection beam, thus causing the emulsion layer to contract in its linear dimensions. However, because of the physical curl characteristics of the film support, the support will resist any contracting action of the emulsion layer until a sufficient quantity of moisture is evaporated from the emulsion layer such that the stress generated in the contracting emulsion layer will overcome the resistance to contraction resulting from the physical curl of the support and thus "pop" the film transparency into a positive curl configuration.

I have found that this objectionable popping can be eliminated by forming a ridge, which can be discontinuous, adjacent the edge of the aperture in each frame of a transparency mount, such that when the opposed frames of the mount are closed upon the transparency, the ridges bear against opposite faces of the transparency with the ridge on one frame offset a given distance from the ridge on the other frame. The ridges thus cooperate to prestress the film held therebetween so as to impart and maintain a positive curl in the image area of the mounted film transparency. Hence, the transparency is, in effect, "prepopped" before it is subjected to the heat of the projection beam.

It is, therefore, an object of the present invention to provide a method of mounting film transparencies with a curved shape imparted thereto and maintained by cooperating offset ridges located adjacent the edges of the aperture of the mount for the transparency.

Another object of the present invention is to provide a mounted film transparency in which "popping" of the film transparency, when it is subjected to heat during projection, is eliminated.

Other objects and a fuller understanding of the invention can be had by referring to the following description and claims taken in conjunction with the accompanying drawings, in which:

In order to facilitate the understanding of the invention, a brief summary will be helpful. As is usual in th mounting of slides or transparencies, a film transparency is sandwiched between two halves or frames of a paperboard slide mount. Each frame of the slide mount has an aperture centrally located therein arranged so that, when assembled, the apertures are substantially in alignment with each other to frame the image area of the film transparency. In my improved mount, ridge members for supporting the marginal portion of the transparency are located on the inner surface of each frame of the paperboard slide mount adjacent each of the apertures. The ridge members surrounding the apertures of one of the frames of the mount are offset relative to the ridge members surrounding the aperture of the second frame of the mount such that when the transparency is placed between the frames of the mount and the frames are sealed together, the respective ridge members of the frames cooperate to impart and maintain a positive curvature to the image area of the transparency. While I have referred to a paperboard mount, it will be apparent that the invention is applicable also to mounts of other materials, e.g., plastic or metal.

Figure 1:
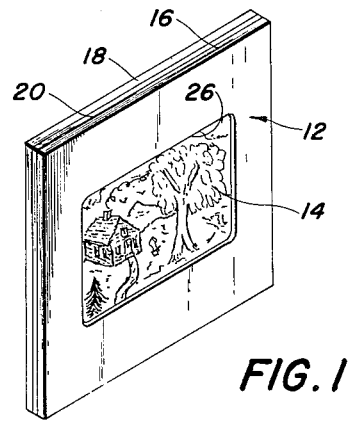
FIG. 1 is a perspective view of a typical mounted film transparency prior to its being prestressed in accordance with the present invention.
Figure 2:
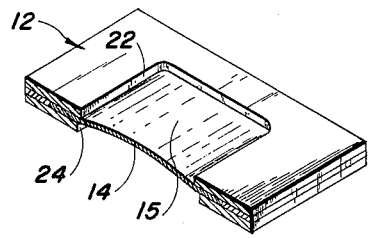
FIG. 2 is a sectional view in perspective of the mounted film transparency shown in FIG. 1.

Referring more particularly to FIGS. 1 and 2, there is illustrated a typical slide mount 12 which includes a film transparency 14 mounted intermediate two paperboard frames 16 and 18. A spacer 20, having a rectangular opening centrally disposed therein, is interposed between the outer portions of frames 16 and 18 of mount 12. Film transparency 14 has a tendency to expand in its lateral dimensions when it is heated; hence, the size of the opening in spacer 20 is made large enough to accommodate the transparency in its expanded condition. In the finished assembly, the frames and spacer are suitably sealed together to form a relatively rigid unitary support for the transparency.

Figure 3:
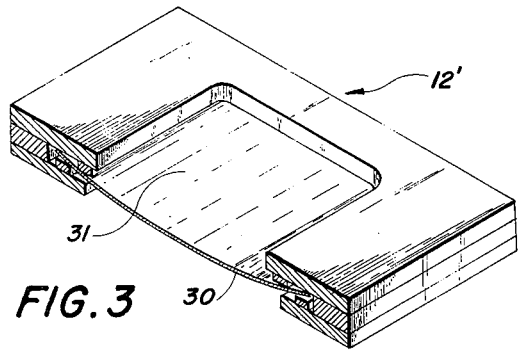
FIG. 3 is an enlarged sectional view in perspective of a mounted film transparency which has been prestressed in accordance with one embodiment of the present invention.

Frames 16 and 18 of mount 12 have apertures 22 and 24, respectively, which apertures are substantially the same size and register to form the aperture 26 in the mount 12. Aperture 22 is preferably made slightly smaller than aperture 24 so that its edges clearly define a mask for the projected or viewed image area of film transparency 14. As previously described, when thus mounted, film transparency 14 will normally have an objectionable tendency to flex or pop during its exhibition. This tendency can be minimized or eliminated by modifying the mount as described hereinbelow and is illustrated for example, in FIGS. 3–10. FIG. 3 illustrates a mount 12', which is generally similar to mount 12, wherein a film transparency 30 has been prepopped. Film transparency 30 is held in the mount under stress such that it is forced to assume a downwardly bowed compound curvature (exaggerated in the drawing for purposes of clarity) with the emulsion coated side 31 of the transparency concavely curved. This prepopped condition is accomplished as will now be described with particular reference to FIGS. 4–6.

Figure 4:
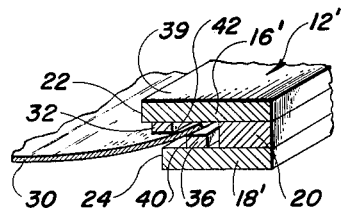
FIG. 4 is an enlarged sectional view in perspective of a portion of the edge of the aperture of the embodiment of the mounted film transparency shown in FIG. 3.
Figure 6:
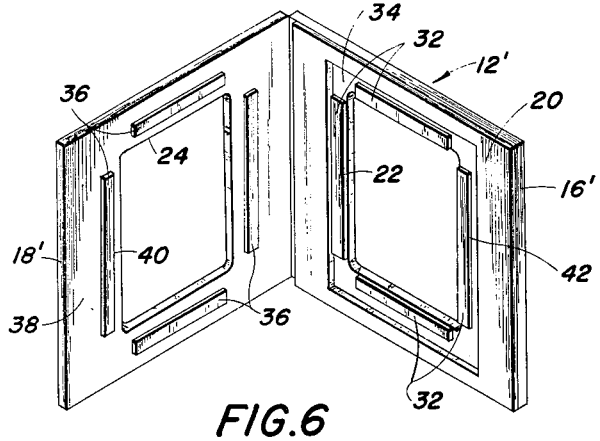
FIG. 6 is an enlarged perspective view of a foldable preformed transparency mount in a partly closed position and constructed in accordance with the embodiment shown in FIG. 3.

As best shown in FIGS. 4 and 6, a conventional foldable mount 12' having a spacer 20 secured to frame 16' has a plurality of discontinuous, relatively narrow, ridge-forming strips 32, located on the inner surface 34 of frame 16', closely adjacent and substantially parallel to the edge of aperture 22. Similarly, a corresponding plurality of narrow, ridge-forming strips 36 are located on the inner surface 38 of frame 18'. Strips 32 and 36 are located on frames 16' and 18' respectively, such that when the mount shown in FIG. 6 is in its fully closed position, corresponding strips 32 and 36 are offset from each other relative to aperture 26, with the inner edges 40 of strips 36 slightly spaced from and parallel to outer edges 42 of strips 32. Therefore, when the frames 16' and 18' of the film transparency mount are sealed together, strips 32 and 36 are complementally arranged relative to each other within the rectangular opening of spacer 20 and are located intermediate the edge of aperture 26 and the inner peripheral edge of spacer 20.

Strips 32 and 36 would preferably be made of paper, with a suitable adhesive backing such that they can readily be applied by hand or machine operation in their relative positions on frames 16' and 18'. However, strips 32 and 36 could also be formed by a printing operation using liquid materials having a high solid content, such as a thick ink or the like, which, upon drying, would provide the desired thickness for the ridge forming strips. The application of the strips to the mount must be accomplished prior to the insertion of a transparency into the mount and the mount being closed and sealed.

The thickness of spacer 20 substantially determines the distance separating inner surface 34 of frame 16' from the inner surface 38 of frame 18'. When strips 32 and 36 are located on the inner surfaces 34 and 38 of frames 16' and 18', respectively, the total thickness of strips 32 and 36 plus the thickness of film transparency 30 is somewhat greater than the distance separating the inner surfaces 34 and 38. Or, as can be stated in another way, the distance from the top of strip 36 to the outer surface 39 of frame 16' is less than the sum of the thickness of transparency 30 plus the distance from the top of strip 32 to the outer surface 39 of frame 16, see FIG. 4. Therefore, when the slide mount of FIG. 6 is in its folded condition with the two halves sealed together, strips 32 and 36 surrounding apertures 22 and 24 will contact opposite surfaces of the marginal portion of the transparency for the purpose of bowing the film transparency. The transparency will be placed in the mount with its emulsion side engaging strips 32 so that the emulsion side will be on the concave side of the bow and thus, a positive curve is imparted to and maintained in the image area of the transparency.

Figure 5:
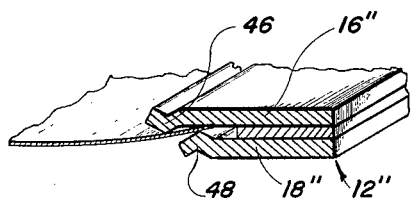
FIG. 5 is an enlarged sectional view in perspective of a portion of the edge of the aperture of a second embodiment of a mounted film transparency made in accordance with the present invention.

Still another embodiment, as shown in FIG. 5, comprises a slide mount 12" which has been embossed to provide integral complemental ridges 46 and 48 of frames 16" and 18", respectively, in place of the separate ridge forming strips 32 and 36 as shown in FIGS. 4 and 6. Ribs 46 and 48 of frames 16" and 18" project towards each other and can be embossed into the surface of the mount adjacent the aperture either before or after film transparency 14 has been sandwiched between frames 16" and 18" of the mount 12".

Figure 8:
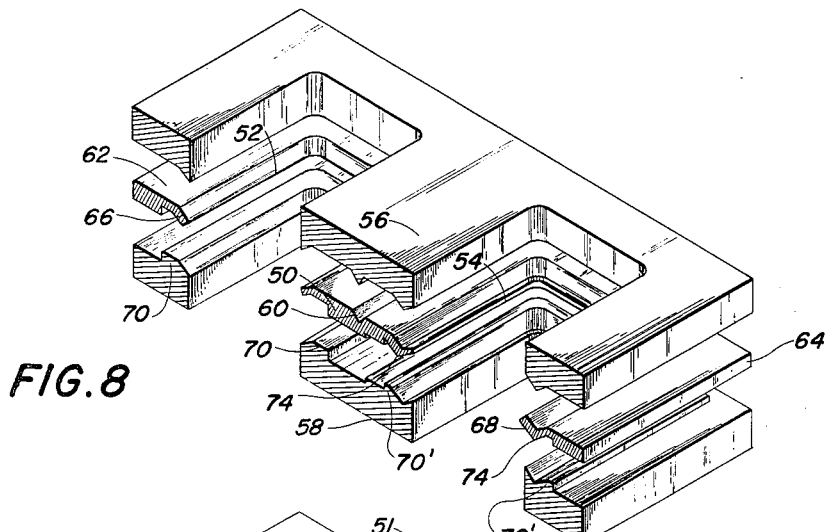
FIG. 8 is an enlarged sectional view in perspective showing an embodiment of forming apparatus for use in preparing transparency mounts having aperture edge portions similar to that shown in FIG. 7.
Figure 9:
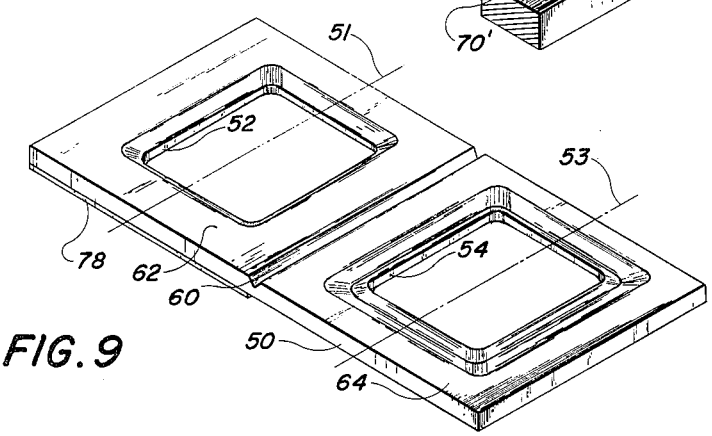
FIG. 9 is a perspective view of a transparency mount formed by use of the apparatus shown in FIG. 8.
Figure 10:
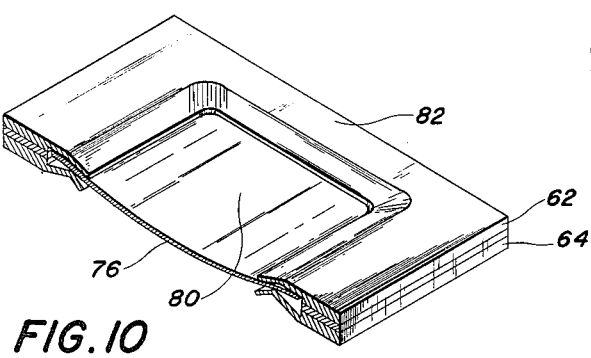
FIG. 10 is an enlarged sectional view in perspective of a mounted film transparency which has been prestressed in accordance with the third embodiment of the present invention.
Figure 7:
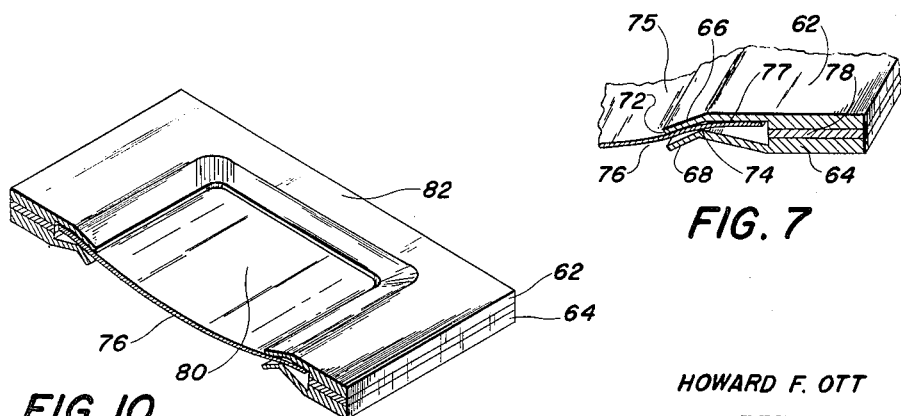
FIG. 7 is an enlarged sectional view in perspective of a portion of the edge of the aperture of a third embodiment of a mounted film transparency made in accordance with the present invention.

Still another embodiment of this invention is shown in FIGS. 7, 8, 9, and 10 wherein flat cardboard stock 50 having two apertures 52 and 54 formed therein, is positioned intermediate a pair of spaced forming jaws 56 and 58 such that when the forming jaws are moved together a crease or fold line 60 is scored in the cardboard stock equidistant from the parallel center lines 51 and 53 of apertures 52 and 54, to thus effectively form a pair of frames 62 and 64. Simultaneously, forming jaws 56 and 58 deform that area of each frame adjacent to its respective aperture to define a pair of lips 66 and 68, shaped as shown in FIGS. 7, 8 and 10. Forming jaw 58 includes male members 70 and 70', which members compress that area of the cardboard mount 50 surrounding apertures 52 and 54 from which the respective lips 66 and 68 are to be formed. Lip 66 adjacent to the aperture of frame 62 is formed that it slopes downwardly, as viewed in FIGS. 7 and 10, relative to the normal plane of frame 62. The edge 72 of lip 66 thus constitutes a ridge which will bear against the emulsion-coated side or upper surface 75 of the marginal portion of the transparency 76. Lip 68 adjacent the aperture of frame 64 is provided with a reverse bend forming a cooperating ridge 74, the apex of which will act as a bearing surface against the lower surface of the marginal portion of the transparency 76.

Mounting is carried out by positioning the film transparency 76 in a suitable spacer 78, which has previously been secured to the inner face of frame 62 as by a suitable adhesive so that the image area 80 of the transparency 76 is in registry with aperture 52 in the frame 62. Frame 64 is then folded over along fold line 60 as in FIG. 9 until it engages spacer 78 to which it is then adhered to form the completed mount 82. As best shown in FIGS. 7 and 10, the ridge on bearing surface 72 formed by lip 66 presses against the marginal surface of film transparency 76 adjacent the edge of the image area and, in cooperation with rib or ridge 74, causes the marginal portions of the film transparency 76 to be displaced from their normal configuration into the curved configuration shown in the figures. Hence, the cooperating ridges formed in the edges of each of the apertures will cause film transparency 76 to assume a compound curvature in which the transparency has positive curl, such as was described above relative to FIGS. 1–6.

In the embodiment of the invention shown in FIGS. 7–10, it should be noted that the portion of frame 62 immediately surrounding lip 66 is somewhat compressed so as to form a shallow groove or undercut area on its inner face as indicated at 77. Thus, room is provided so that the marginal surfaces of the film transparency interposed between lips 66 and 68 of the mount can be located more closely adjacent to the plane of frame 62 of the mount. It will be obvious, therefore, that a greater curvature can be impressed and maintained upon the bowed image area of the film transparency without exending that same bowed portion beyond the plane of frame 64. As the antipopping characteristics of a film transparency are related to the amount of positive curvature impressed upon the film transparency, the embodiment shown in FIGS. 7–10 is particularly desirable. In addition, as mounted film transparencies are commonly shown in automatic slide changing projection apparatus, it is particularly desirable that no portion of the film transparency or of the mount which carries the film transparency project beyond the normal planes of frames 14 and 16 of the mount, as adjacent slides will otherwise tend to "hang up" on each other, or on the automatic slide changing apparatus.

It will be seen that the invention provides an improved mount in which complemental ribs or ridges are formed on the halves of the mount adjacent the edge of the aperture therein, which ribs contact the marginal portions of the film transparency and bend them at an angle to the general plane of the slide mount whereby the portion of the transparency within the aperture assumes a curved shape so that popping does not occur during the exhibition of the slide. Since the curvature is formed by engagement of the mount with the edge of the transparency, the method involves no danger of injury to the picture-bearing portion of the transparency.

The invention has been described in detail with particular reference to preferred embodiments thereof, but it will be understood that variations and modifications can be effected within the spirit and scope of the invention as described hereinabove and as defined in the appended claims.

I claim:
1. In a film transparency mount the combination comprising:
   (a) a pair of spaced apertured members arranged in overlying relation in substantially parallel planes with their apertures substantially in registry;
   (b) a film transparency including an image area bounded by marginal surfaces, said image area being substantially in registry with said apertures and said marginal surfaces being located between said spaced members; and
   (c) means located on the adjacent inner surfaces of said members and at corresponding sides, and in bounding relation to the apertures therein for engaging opposite faces of said transparency to prestress the transparency to impart a curvature to that portion of the transparency spanning said apertures and comprising:
      (1) projections extending inwardly from each of the inner surfaces of said members which are parallel to each other and having tip portions contacting opposing surfaces of said transparency about the margin thereof;
      (2) said projections on one member being spaced a different distance from the center of said apertures than the corresponding projections on the other of said members so that the tip portions of opposed projections that engage opposite faces of said transparency are in offset relation to one another;
      (3) the distance from the tip portion of each of said projections on one of said members to the outer surface of the opposite member being less than the sum of the thickness of said transparency plus the distance from the tip portion of the corresponding projection on said other member to the same outer surface.

2. The film transparency mount of claim 1 in which each of said projections is limited in height such that the tip portion thereof does not project beyond the outer surface of the opposed member.

3. The film transparency mount of claim 1 in which said projections located on each of said members comprises a plurality of pairs of corresponding discontinuous members projecting from the inner surface of said member, each pair of discontinuous members being spaced about the center of said aperture from another pair of discontinuous members.

4. The film transparency mount of claim 1 in which said means located on each of said members comprises a plurality of thin strips each having its innermost surface contacting said marginal portion of said film transparency.

5. The film transparency mount of claim 4 in which said innermost surface of each of said strips on each of said members is located in a plane parallel to the general plane of its apertured member, said planes of said innermost surfaces being separated by a distance less than the given thickness of said transparency.

6. The film transparency mount of claim 1 in which said projections comprise edge portions of each of said members adjacent each aperture, said edge portions being angularly inclined in opposite directions so that each extends from the general plane of its apertured member toward the other apertured member.

7. The film transparency mount of claim 6 in which the edge portion adjacent the aperture of one member is angularly inclined towards the opposite member from the general plane of said one member and the edge portion adjacent the aperture of the second member is angularly inclined so as to lie in a pair of angularly related planes the line of intersection of which constitutes said tip portion thereof.

8. A mount for receiving a film transparency of a given thickness and having an image area bounded by marginal surfaces, said mount comprising:
   (a) a pair of cooperating frame members having apertures therein of substantially the same size as the image area of said transparency and arranged to be positioned in overlying relation in substantially parallel planes with their apertures substantially in registry and their opposing inner walls spaced a given distance apart; and
   (b) means located on the adjacent inner surfaces of said members and at corresponding sides of the respective apertures of each of said members and arranged to project toward the other member a given distance when said members are so positioned,
      (1) said means on one of said members being spaced a different distance from the center of said apertures than the corresponding means on the other of said members,
      (2) said means being so located on said members as to engage opposite marginal surfaces of a transparency when positioned in said mount with the image area of the transparency aligned with said apertures whereby said means imparts and maintains a curvature in said image area of said transparency.

9. The mount for receiving a film transparency of claim 8 in which the sum of the height of the inward objections of said means on both of said members on any corresponding side of said apertures plus the given thickness of the transparency to be positioned in alignment with said apertures is greater than the distance separating the opposing inner surfaces of said cooperating members.

10. The mount for receiving a film transparency of claim 9 in which the inner surface of each of said frame members from which said means project toward the other member are spaced apart a distance more than the thickness of said transparency.

11. The method of imparting and maintaining a positive curvature to the image area of a film transparency when mounted between two spaced apertured frames of a slide mount comprising the step of:
   simultaneously applying and maintaining a force to opposed marginal portions of the film transparency solely on one face of the transparency along a first area adjacent said image area of each such portion and solely on the opposite face of the transparency along a second area of each such portion and spaced outwardly from said image area and said first area so that said image area of the transparency is stressed into said positive curvature.

12. The method of imparting and maintaining a positive curl in the image area of a film transparency mounted between two apertured frames of a slide mount comprising the steps of:

(1) positioning and spacing the apertured frames in substantially parallel spaced apart relation;

(2) positioning a film transparency between the apertured frames so that the marginal edges of the transparency are spaced inwardly from the marginal edges of the apertured frames;

(3) contacting marginal portions of the transparency inwardly from its edges along at least two areas lying at different distances from the center line of the apertures of the frames in such manner sufficient as to impart and maintain said positive curl; and (4) securing the marginal edges of the apertured frames along an area spaced outwardly from the transparency marginal edges so that the film transparency may freely expand and contract.

References Cited by the Examiner
UNITED STATES PATENTS
3,013,354  12/1961  Wilkund _____ 40—152

EUGENE R. CAPOZIO, *Primary Examiner.*

JEROME SCHNALL, *Examiner.*

WENCELSO J. CONTRERAS, *Assistant Examiner.*